(12) United States Patent
Pedersen et al.

(10) Patent No.: US 6,804,956 B2
(45) Date of Patent: Oct. 19, 2004

(54) HYDRAULIC STEERING SYSTEM

(75) Inventors: Poul Henning Holm Pedersen, Sonderborg (DK); Jørgen Clausen, Sonderborg (DK); Bjarne Schmidt, Augustenborg (DK)

(73) Assignee: Sauer-Danfoss ApS (DK)

(*) Notice: Subject to any disclaimer, the term of this patent is extended or adjusted under 35 U.S.C. 154(b) by 56 days.

(21) Appl. No.: 10/405,315

(22) Filed: Apr. 2, 2003

(65) Prior Publication Data
US 2003/0196432 A1 Oct. 23, 2003

(30) Foreign Application Priority Data
Apr. 17, 2002 (DE) .......................... 102 16 959

(51) Int. Cl.⁷ ............................................ F16D 31/02
(52) U.S. Cl. .......................................... 60/384; 60/385
(58) Field of Search .................. 60/384, 385, 386, 60/387

(56) References Cited

U.S. PATENT DOCUMENTS

| | | | |
|---|---|---|---|
| 3,960,234 A | 6/1976 | Morgan | |
| 3,996,838 A | 12/1976 | Goff | |
| RE30,291 E | 6/1980 | Goff et al. | |
| 4,354,350 A | 10/1982 | Tischer et al. | |
| 5,806,561 A | * 9/1998 | Pedersen et al. | ............... 60/384 |
| 6,016,656 A | 1/2000 | Sorensen | |
| 6,220,289 B1 | 4/2001 | Zenker et al. | |
| 6,484,840 B1 | * 11/2002 | Sevelsted | ..................... 60/384 |

FOREIGN PATENT DOCUMENTS

| | | |
|---|---|---|
| DE | 19511501 | 10/1996 |
| DE | 19607064 | 8/1997 |
| DE | 19919015 | 1/2001 |
| WO | WO-96/30248 | 10/1996 |

* cited by examiner

Primary Examiner—Edward K. Look
Assistant Examiner—Michael Leslie

(57) ABSTRACT

A hydraulic steering system (1) with a supply connection arrangement, having a high-pressure connection (P) and a low-pressure connection (T), and with a working connection arrangement (L, R), a directional valve (2) and a metering pump unit (3, 4) being arranged between the supply connection arrangement and the working connection arrangement, the metering pump arrangement having at least two hydraulically parallel-connected and mechanically parallel-operated metering pumps (3, 4) with a shut-off valve (6) in a hydraulic connection between the two metering pumps (3, 4), said shut-off valve (6) having a return spring (16) and a first control inlet (15) that is connected with the high-pressure connection (P).

15 Claims, 3 Drawing Sheets

HYDRAULIC STEERING SYSTEM

BACKGROUND OF THE INVENTION

Existing hydraulic steering systems with a supply connection arrangement, have a high-pressure connection and a low-pressure connection, with a working connection arrangement, a directional valve and a metering pump unit being arranged between the supply connection arrangement and the working connection arrangement; a metering pump arrangement having at least two hydraulically parallel-connected and mechanically parallel-operated metering pumps with a shut-off valve in a hydraulic connection between the two metering pumps; with the shut-off valve having a return spring and a control inlet that is connected with the high-pressure connection.

A hydraulic steering system of this kind is disclosed in DE 195 11 501 A1.

A steering system of this kind is preferably used for the steering of vehicles. Both the metering pumps and the directional valve are connected with a steering handwheel or a similar device. When the steering handwheel is turned, the directional valve is displaced in the desired direction, and the metering pump arrangement supplies hydraulic fluid until a steering motor connected to the working connections of the working connection arrangement has reached the desired position. During normal, undisturbed operation, as long as hydraulic fluid with a sufficient pressure is available at the high-pressure connection, both metering pumps are active. They can supply a correspondingly large volume of hydraulic fluid, which enables a fast reaction of the steering motor to movements of the steering handwheel.

When the pressure at the high-pressure connection drops, for example because of a defect in the hydraulic supply, the hydraulic steering can no longer be operated through support from this hydraulic pressure. In this so-called "emergency operation" the metering pumps are also used as auxiliary pumps, that is, the metering pumps are used for producing the pressure of the hydraulic fluid. However, for this purpose, the required energy must be provided via the steering handwheel, that is, by human muscular strength. Therefore, by means of the shut-off valve, the connection between the two metering pumps is interrupted. One of the metering pumps will be short-circuited, and the operator now only has to activate the other metering pump. To achieve the same deflection of the steering motor, the operator will have to turn the steering handwheel.

In the known hydraulic steering system, the shut-off valve between two metering pumps is acted upon by pressure from the high-pressure line and in the other direction by the force of the return spring and the pressure in the low-pressure line. However, to an increasing extent, additional consumers (or "loads") are connected to the low-pressure line, which can work with a lower pressure. This measure serves the purpose of saving energy. When the steering is not activated, that is, the hydraulic steering system is not active; the hydraulic fluid simply flows through the steering system. Via a usually available load-sensing system (LS-system) the supply pressure is correspondingly reduced, so that in the low-pressure line, also called tank line, merely a lower pressure of, for example, 15 to 25 bars is effective, with which a coupling or a brake can be activated. When the steering system is activated, however, a higher supply pressure is available. A large share of this pressure is, however, "consumed" in the steering system, so that a correspondingly reduced pressure is again ruling in the tank line.

It is, however, a condition for using the low-pressure or tank line for supplying a low-pressure hydraulic that the first steering inlet of the shut-off valve is acted upon by a correspondingly higher pressure. This pressure is produced in that a prestressed non-return valve is arranged after the branch of a steering pressure line to the first steering inlet of the shut-off valve. This non-return valve ensures that a differential pressure of 8 to 10 bars exists over the shut-off valve, that is, the pressure on the side of the first steering inlet is by 8 to 10 bars higher than the pressure in the low-pressure line. This partially causes substantial energy consumption, as the hydraulic fluid having a correspondingly high pressure must pass the highly prestressed non-return valve.

It is therefore a principal object of this invention to reduce the energy consumption when using the steering system in connection with a low-pressure connection, which is loaded by consumers.

SUMMARY OF THE INVENTION

The problems of existing hydraulic systems as mentioned above are solved in that the shut-off valve has a second steering inlet, which can be acted upon by a pressure from a lowest-pressure connection.

Thus, next to the low-pressure connection, which is also loaded by consumers, a lowest-pressure connection is used, with which it is ensured that it always carries a relatively low pressure. Usually, this is the tank pressure, the atmospheric pressure or another pressure, also called T0. Still, also even lower pressures can rule in many hydraulic systems, as long as it is ensured that no significant forces are acting upon the shut-off valve through the pressure at the lowest-pressure connection. The pressure at the first steering inlet merely has to overcome the force of the return spring. Accordingly, the pressure difference over the shut-off valve can be kept small. Energy losses are substantially reduced.

The pressure at the second steering inlet acts in the same direction as the return spring. Then, when desired, the effect of the return spring can be supported.

Also, a non-return valve prestressed with low opening pressure is arranged in high-pressure line connected with the high-pressure connection, a steering line branching off to the first steering connection in front of said valve. This non-return valve is not required to build up a pressure over the shut-off valve, with which pressure the shut-off valve is switched to one of its two working positions, but serves as a block to prevent retroaction from the steered wheels on the hydraulic system, the so-called "kick-back". For this reason, a high prestressing is not required either. On the contrary, this non-return valve can be prestressed with such a small force that merely a closed state is ensured, and no larger forces are required to open it. Accordingly, also the pressure drop at such a non-return valve is small. The energy consumption is kept low.

It is particularly preferred that the opening pressure is maximum 1 bar. Compared with the known case, this is relatively little. Usually, an even smaller pressure will be sufficient, for example 0.5 bar. In the known case, this pressure would be in the range around 10 bars.

Preferably, the second steering inlet is connected with a changeover valve, which connects the second steering inlet with either the lowest-pressure connection or the high-pressure connection. Thus, the second steering inlet can additionally be used for a deliberate switching from the use of both metering pumps to the use of one metering pump. Thus, the transmission ratio between the operation of the steering handwheel or a similar manipulator and the steered wheels can be changed. For example, when driving on a public road, it is possible to use only one metering pump, that is, a smaller displacement, so that the deflection of the steered wheels is made safer and less sensitive. When, however, the vehicle is driven offroad, for example on a building site, it may be expedient to use both metering pumps. In this case the same deflection of the steered wheels is achieved already with small deflections of the steering handwheel. Thus, the shut-off valve gets an additional purpose, namely selecting the "transmission ratio" between the steering handwheel and the steered wheels.

It is also preferred that the changeover valve can be remote-controlled. Thus, the changeover valve can be arranged near or even in the steering system, without negative influence on its operational qualities. The changeover valve can, for example, be activated from the area of the driver seat.

The changeover valve is a solenoid valve. A solenoid valve is a particularly simple embodiment of a remote-controllable valve.

The disconnectable metering pump has at least threefold the displacement of the other metering pump. Accordingly, a transmission ratio of at least 1:4 occurs, when the operation with both metering pumps is compared with the operation with only one metering pump.

Also, the shut-off valve has a slide, which, together with a distributor plate closed in the area of the slide and a housing surrounding the slide, borders a low-pressure chamber. The relation of the pressure in the low-pressure chamber to the pressure at the first steering connection thus determines the position of the slide. The distributor plate is closed at least in the area of the low-pressure chamber, that is, it creates a genuine border surface for the low-pressure chamber. Accordingly, the pressure in the low-pressure chamber is not influenced by any pressures in the metering unit, which is separated from the low-pressure chamber by the distributor plate.

Preferably, the low-pressure chamber is sealed in relation to all hydraulic lines. In this case, the second steering inlet can even be opened towards the surroundings, that is, under these circumstances atmospheric pressure rules in the low-pressure chamber. Accordingly, only a relatively low pressure is required to move the slide.

It is preferred that the slide has a seal, which is displaceable together with the slide in relation to the housing. This seal prevents the hydraulic fluid from penetrating past the slide.

A lowest-pressure channel is provided in the housing, which ends in the low-pressure chamber in the area of the distributor plate. Via the lowest-pressure channel the pressure from the lowest-pressure connection reaches the low-pressure chamber. As the lowest-pressure channel ends in the area of the distributor plate, the low pressure can practically act upon the slide over the complete movement stroke of the slide.

In addition, a recess surrounding the low-pressure chamber is arranged between the distributor plate and the housing, the lowest-pressure channel ending in said recess. In this case, the lowest-pressure channel can no longer be closed by the slide. In all positions of the slide it is ensured that the slide is acted upon by the pressure in the lowest-pressure channel.

A first section of the lowest-pressure channel extends perpendicularly to the distributor plate. This facilitates the manufacturing.

The lowest-pressure channel has a second section, which extends radially to the movement direction of the slide. This also facilitates the manufacturing. The lowest-pressure channel then extends at a right angle.

DESCRIPTION OF THE EMBODIMENTS OF THE INVENTION

Figure 1:
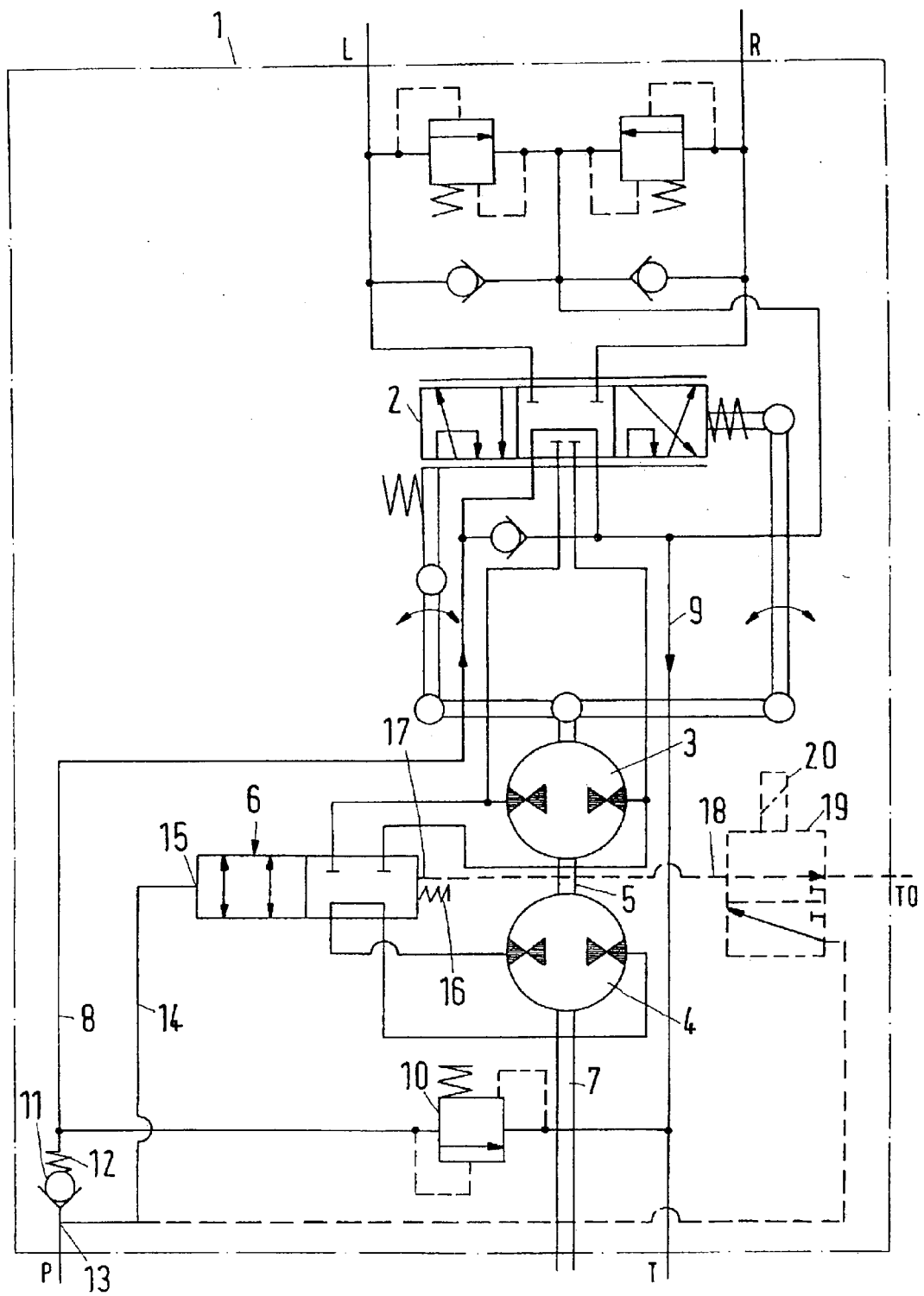
FIG. 1 is a hydraulic schematic diagram of a steering system in which this invention can function.

A steering system 1 (FIG. 1) has a directional valve 2, which is connected with two working connections L, R, to which a working motor, not shown in detail, can be connected.

The other side of the directional valve 2 is connected with a metering pump unit having a first metering pump 3 and a second metering pump 4. Both metering pumps 3, 4 are hydraulically connected in parallel and mechanically operable in parallel via a common shaft 5.

Both metering pumps 3, 4 are hydraulically connected in parallel in that the inlet connection of the metering pump 3 can be connected with the corresponding inlet connection of the second metering pump 4 and that the outlet connection of the first metering pump 3 can be connected with the outlet connection of the second metering pump 4, when a shut-off valve 6 is switched from the position shown in FIG. 1 to its other position. In the position of the shut-off valve shown in FIG. 1, the second metering pump 4 is short-circuited, so that on a rotation of a shaft 7 only the first metering pump 3 is able to supply hydraulic fluid to the directional valve 2.

Further to the working connection arrangement having the working connections L, R, the steering system 1 also has a supply connection arrangement, which has a high-pressure connection P and a low-pressure connection T. The high-pressure connection P is connected with a pressure source, for example, a pump. The low-pressure connection T is connected with a pressure sink, for example, a tank. However, in a line, which is connected with the low-pressure connection T, consumers can be arranged, which are working with a low pressure, for example, brakes or clutches.

Via a high-pressure line 8, the high-pressure connection P is connected with the directional valve 2, and via a low-pressure line 9, the low-pressure connection T is connected with the directional valve 2. When the directional valve 2 is in the neutral position shown in FIG. 1, the high-pressure line 8 and the low-pressure line 9 are connected with each other via the directional valve 2.

Between the high-pressure line 8 and the low-pressure line 9 is arranged a pressure control valve 10. In a manner not shown in detail, the steering system 1 is connected with a load-sensing line (LS-line), whose pressure controls the pump supplying the high-pressure connection P. However, it is also possible to use a pump with a fixed displacement, with which the excess oil is displaced direct to the tank.

In the high-pressure line 8 is arranged a non-return valve 11, which is loaded in the closing direction by a spring 12. Accordingly, the non-return valve 11 has an opening pressure. In the present case, this is in the range about 0.5 bars. The task of the non-return valve 11 is to prevent a retroaction of the working connection arrangement L, R on the high-pressure connection P.

In the flow direction, before the non-return valve 11 is arranged a branch 13, from which a steering line 14 leads to the first steering inlet 15 of the shut-off valve 6. The pressure at the first steering inlet 15 causes that the shut-off valve 6 is displaced against the force of a return spring 16 in such a way that the two metering pumps 3, 4 are connected in parallel.

On the side of the shut-off valve 6, on which the return spring 16 is arranged, there is a second steering inlet 17, which is connected with a lowest-pressure connection T0 via a steering line 18. The lowest-pressure connection T0 is practically pressure-free, that is, here tank pressure or atmospheric pressure actually rules.

Accordingly, a small pressure acting upon the first steering inlet 15 is sufficient to bring the changeover valve to the working position, in which the two metering pumps 3, 4 are connected in parallel. The pressure at the first steering inlet 15 merely has to be sufficient to overcome the force of the return spring 16. A higher pressure, for example to balance the increased pressure in the low-pressure line T is not required. Accordingly, higher pressure losses do not occur at the non-return valve 11, which no longer needs an additional prestressing function, meaning that the steering system can work with lower energy losses.

When, however, the pressure at the high-pressure connection P decreases, the return spring 16 switches the shut-off valve 6 to the shut-off position shown in FIG. 1. Then, only the metering pump 3 is working, which can in this case be used as an emergency pump, to supply hydraulic fluid under pressure through the directional valve 2 to the working connection arrangement L, R. In this case, the vehicle remains steerable.

Shown with dotted lines is a changeover valve 19, (FIG. 1) having a magnetic drive 20, that is, being in the form of a solenoid valve. Of course, the changeover valve 19 can also be driven mechanically or hydraulically. The changeover valve 19 connects the second steering line 18 and thus the second steering inlet 17 with either the lowest-pressure connection T0 or the high-pressure connection P. As the changeover valve 19 can be remote-controlled via the magnetic drive, such a changeover can take place from the driver seat. By changing over the changeover valve 19, the driver can set the "transmission ratio" between a rotation of the shaft 7 and the corresponding deflection of the steered wheels. In the position of the shut-off valve 6 shown in FIG. 1, the driver must turn the shaft 7 substantially faster to achieve the same deflection of the steered wheels. This is, for example, desirable when driving in the streets, where the driver wishes to make the steered wheels less sensitive and thus safer. When, however, the vehicle is driving on a building site, a slower reaction of the steered wheels to a rotary movement of the shaft 7 may be desirable, when the driver has to move the wheels against the resistance of a difficult ground. In this case, the second metering pump 4 is turned off, so that a correspondingly smaller displacement occurs and the wheels are only moved accordingly at larger steering hand-wheel movements.

Figure 2:
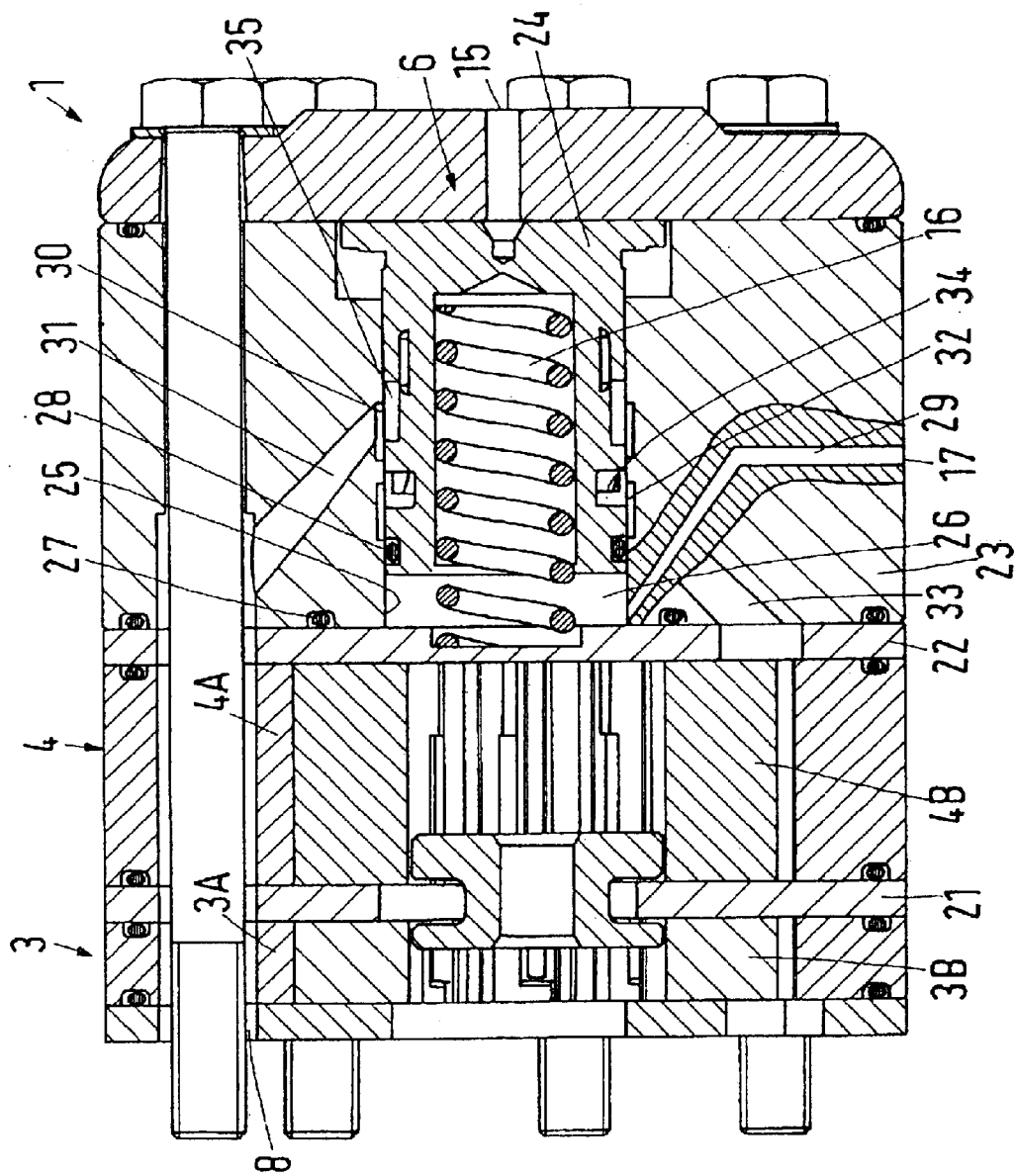
FIG. 2 is a longitudinal cross sectional view of a steering system according to a first embodiment of this invention.

FIG. 2 shows schematically a sectional view through the steering system 1. The steering system 1 has two metering pumps 3, 4, each provided with a toothed ring 3A, 4A and a gear wheel 3B, 4B. Through the intermediary of a plate 21, the two metering pumps 3, 4 are flanged onto each other. Through the intermediary of a distributor plate 22, the metering pump 3 is connected with a housing 23, in which is arranged the slide 24 of the shut-off valve 6. The slide is arranged in a bore 25 in the housing 23 and borders, together with the housing 23 and the distributor plate 22, a low-pressure chamber 26, in which the slide is axially movable. Also the return spring 16 is arranged in the low-pressure chamber 26. In the area of the low-pressure chamber 26 the distributor plate 22 has no opening, that is, it is tight here. A sealing 27 is arranged between the housing 23 and the distributor plate 22. At the end facing the distributor plate 22, the slide 24 also has a sealing 28, which moves together with the slide 24 in relation to the housing 23. Thus, the low-pressure chamber 26 is sealed in relation to all lines and areas carrying hydraulic fluid.

In the housing 23 is provided a lowest-pressure channel 29, which is open towards the atmosphere. In this case, the atmosphere forms the lowest-pressure connection T0. A condition for this is, however, that the sealings 27, 28 towards the low-pressure chamber 26 are in fact fluid tight.

The lowest-pressure channel 29 ends in the low-pressure chamber 26 in the area of the distributor plate 22, that is, the front side of the slide 24 bordering the low-pressure chamber 26 is permanently exposed to the pressure at the lowest-pressure connection T0.

In the wall of the bore 25 is arranged a circumferential groove 30, which is connected with the high-pressure line 8 via a high-pressure channel 31. Instead of the circumferential groove, an interrupted groove can also be used, that is, several pockets distributed over the circumference. An additional groove 32 in the wall of the bore 25 is connected with a supply channel 33. Only one supply channel 33 is shown. In fact, however, one supply channel 33 exists for each pocket formed between the teeth of the gear wheel 3B and the teeth of the toothed ring 3A. In the position of the slide 24 shown in FIG. 2, all supply channels 33 are short-circuited by a circumferential groove 34 on the circumference of the slide 24.

The slide has additional, axially offset recesses 35 in its circumferential surface, said recesses overlapping the corresponding openings of the high-pressure channels 31 in the circumferential direction. Several high-pressure channels 31 are provided, namely one for each pocket formed between the teeth of the gear wheel 3B and the teeth of the toothed ring 3A. The supply in the correct position of the high-pressure channels 31 with hydraulic fluid is ensured by valve means not shown in detail.

The front side of the slide 24 on the side facing the return spring 16 is connected with the first steering inlet 15, here shown as a channel. Of course, also other channel extensions can be imagined.

When the corresponding pressure rules at the first steering inlet 15, the slide 24 is displaced against the force of the return spring 16, to the left in FIG. 2, the recesses 35 overlapping the grooves 30 and 32, thus connecting the high pressure channels 31 with the supply channels 33, meaning that both metering pumps 3, 4 are active. When, however, the slide 24 is displaced by the force of the return spring 16 in the direction shown in FIG. 2, the first metering pump 4 is short-circuited, and only the second metering pump 3 is active.

Figure 3:
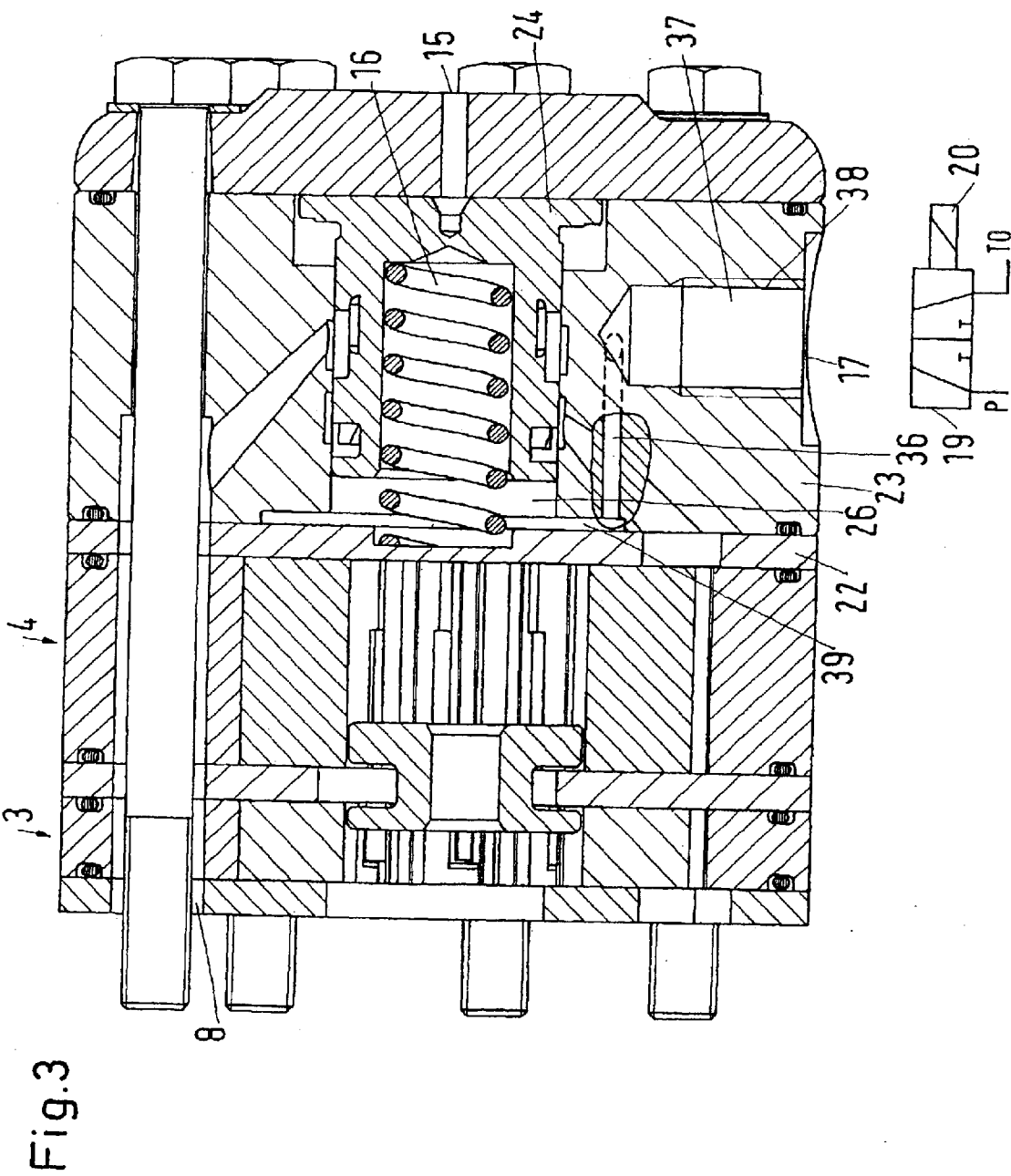
FIG. 3 is a view similar to that of FIG. 2 according to a second embodiment of this invention.

FIG. 3 shows a modified embodiment, in which parts also shown in FIG. 2 have the same reference numbers.

A first difference is that the low-pressure chamber 26 is merely "normally" sealed, that is, no special measures have been taken to prevent hydraulic fluid from penetrating into the low-pressure chamber 26.

The lowest-pressure channel has a first section 36, which substantially extends perpendicularly to the distributor plate 22, and a second section 37, which extends substantially radially to the movement direction of the slide 24. In the second section 37 a fixing thread 38 may be provided. Schematically shown is also the changeover valve 19 with the magnetic drive 20, which connects either the lowest-pressure connection T0 or the high-pressure connection P with the second control inlet 17.

The low-pressure chamber 26 expands in the contact area of the housing 23 with the distributor plate 22 in its circumferential recess 39, which surrounds the low-pressure chamber 26. The first section 36 of the lowest-pressure channel starts from this recess 39. Otherwise, the mode of operation is the same as with the embodiment according to FIG. 2.

It is thus seen that this invention will achieve at least all of its stated objectives.

What is claimed is:

1. A hydraulic steering system with a supply connection arrangement, having a high-pressure connection and a low-pressure connection, and with a working connection arrangement, a directional valve and a metering pump unit being arranged between the supply connection arrangement and the working connection arrangement, the metering pump arrangement having at least two hydraulically parallel-connected and mechanically parallel-operated metering pumps with a shut-off valve in a hydraulic connection between the two metering pumps, said shut-off valve having a return spring and a first control inlet that is connected with the high-pressure connection, characterized in that the shut-off valve (6) has a second steering inlet (17), which can be acted upon by a pressure from a lowest-pressure connection (T0).

2. The steering system according to claim 1, characterized in that the pressure at the second steering inlet (17) acts in the same direction as the return spring (16).

3. The steering system according to claim 1, characterized in that a non-return valve (11) prestressed with low opening pressure is arranged in high-pressure line (8) connected with the high-pressure connection (P), a steering line (14) branching off to the first steering connection (15) in front of said valve (11).

4. The steering system according to claim 3, characterized in that the opening pressure is maximum 1 bar.

5. The steering system according claim 1, characterized in that the second steering inlet (17) is connected with a change-over valve (19), which connects the second steering inlet (17) with either the lowest-pressure connection (T0) or the high-pressure connection (P).

6. The steering system according to claim 5, characterized in that the changeover valve (19) can be remote-controlled.

7. The steering system according to claim 5, characterized in that the changeover valve (19) is a solenoid valve.

8. The steering system according to claim 5, characterized in that the disconnectable metering pump (4) has at least threefold the displacement of the other metering pump (3).

9. The steering system according to claim 1, characterized in that the shut-off valve (6) has a slide (24), which, together with a distributor plate (22) closed in the area of the slide (24) and a housing (23) surrounding the slide (24), borders a low-pressure chamber (26).

10. The steering system according to claim 9, characterized in that the low-pressure chamber (26) is sealed in relation to all hydraulic lines.

11. The steering system according to claim 10, characterized in that the slide (24) has a sealing (28), which is displaceable together with the slide (24) in relation to the housing (23).

12. The steering system according to claim 9, characterized in that a lowest-pressure channel (29; 36, 37) is provided in the housing (23), which ends in the low-pressure chamber (26) in the area of the distributor plate (22).

13. The steering system according to claim 12, characterized in that a recess (39) surrounding the low-pressure chamber (26) is arranged between the distributor plate (22) and the housing (23), the lowest-pressure channel (36, 37) ending in said recess (39).

14. The steering system according to claim 13, characterized in that a first section (36) of the lowest-pressure channel (36, 37) extends perpendicularly to the distributor plate (22).

15. The steering system according to claim 14, characterized in that the lowest-pressure channel has a second section (37), which extends radially to the movement direction of the slide (24).

* * * * *